United States Patent
Liu et al.

(10) Patent No.: US 9,846,932 B2
(45) Date of Patent: Dec. 19, 2017

(54) DEFECT DETECTION METHOD FOR DISPLAY PANEL BASED ON HISTOGRAM OF ORIENTED GRADIENT

(71) Applicant: SHENZHEN CHINA STAR OPTOELECTRONICS TECHNOLOGY CO., LTD., Shenzhen, Guangdong (CN)

(72) Inventors: Xiaole Liu, Shenzhen (CN); Jingbo Li, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 212 days.

(21) Appl. No.: 14/417,094

(22) PCT Filed: Nov. 18, 2014

(86) PCT No.: PCT/CN2014/091415
§ 371 (c)(1),
(2) Date: Jan. 23, 2015

(87) PCT Pub. No.: WO2016/070462
PCT Pub. Date: May 12, 2016

(65) Prior Publication Data
US 2016/0364849 A1    Dec. 15, 2016

(30) Foreign Application Priority Data
Nov. 3, 2014  (CN) .......................... 2014 1 0610082

(51) Int. Cl.
*G06K 9/00*   (2006.01)
*G06T 7/00*   (2017.01)
*G06K 9/46*   (2006.01)

(52) U.S. Cl.
CPC ............ *G06T 7/001* (2013.01); *G06K 9/4671* (2013.01); *G06T 7/0004* (2013.01); *G06T 2207/20081* (2013.01); *G06T 2207/30121* (2013.01)

(58) Field of Classification Search
USPC ....... 382/149, 190, 170, 143, 145, 189, 224, 382/103, 168, 173, 181, 199, 266; 1/1; 250/208.1, 363.2; 348/254, 142; 378/20, 378/205; 600/407
See application file for complete search history.

(56) References Cited

U.S. PATENT DOCUMENTS

| | | | | |
|---|---|---|---|---|
| 8,548,196 B2* | 10/2013 | Koo | ................... | G06K 9/00375 382/103 |
| 8,649,560 B2* | 2/2014 | Lee | ................... | G06K 9/00375 382/103 |
| 9,392,160 B2* | 7/2016 | Sfaradi | .............. | H04N 5/23212 |

(Continued)

*Primary Examiner* — Anh Do
(74) *Attorney, Agent, or Firm* — Muncy, Geissler, Olds & Lowe PC

(57) ABSTRACT

In order to detect defects in display panels by an automatic way accurately and quickly, the present invention proposes a method combining image feature extraction and classifier model. It calculates the histograms of oriented gradient (HOG) of images of the display panel collected by an industrial camera of a detection apparatus as feature vectors. Then use them as input samples to train the classifier model to recognize the defects of the display panel.

19 Claims, 9 Drawing Sheets

(56) References Cited

U.S. PATENT DOCUMENTS

2007/0171404 A1\* 7/2007 Ben-Tulila ............ G01N 21/956
 356/237.1
2009/0285459 A1\* 11/2009 Aggarwal .......... G06K 9/00067
 382/125

\* cited by examiner

DEFECT DETECTION METHOD FOR DISPLAY PANEL BASED ON HISTOGRAM OF ORIENTED GRADIENT

BACKGROUND OF THE INVENTION

1. Field of the Invention

The present invention relates to a display panel technology, and more particularly, to a defect detection method for a display panel based on histogram of oriented gradient.

2. Description of Prior Art

With a rapid development of display technology, defect detection on display panels during each manufacturing process is an inevitable procedure in order to assure and improve the display panel yield rate. The display panel manufacture is complicated. There are various types of defects such as short circuit, break circuit, mura, and foreign matter. Currently, detection on TFT-LCD defects primarily includes human visual inspection, automatic visual inspection, and electrical parameter detection. The human visual inspection has a problem of lower efficiency and erroneous recognition due to judgment of perceptual experience and fatigue. Therefore, developing the automatic visual inspection is an effective way to meet the requirements of rapidly developed TFT-LCD industrial inspection.

The automatic visual inspection combines computer image process and model recognition based on machine vision technology. Its primary concept is collecting an image of a to-be-detected object and extracting valuable information from the image for proceeding with model recognition and classification, thereby carrying out defect detection and determination. Since machine visual detection has wide application scope and is accurate, effective, and reliable, it has received considerable attention in modern industrial detection.

For example, the machine visual detection applied to defect detection on liquid crystal display panels presently includes a two-dimensional DWT algorithm, a sub-image-based singular value decomposition, a defect feature information extraction combining one-dimensional Fourier transformation and full scale wavelet transform, and an image segmentation algorithm based on Chan-Vese model. However, the automatic inspection based on machine vision cannot have detection accuracy and speed at the same time, thereby affecting the improvements of capacity of production for the display panels.

SUMMARY OF THE INVENTION

The objective of the present invention is to provide a defect detection method for a display panel based on histogram of oriented gradient, for improving the accuracy of defect detection on the display panel and the detection speed.

The technical schemes of the present invention are provided below.

An aspect of the present invention is to provide a defect detection method for a display panel based on histogram of oriented gradient, said method comprising: capturing an image of a substrate of the display panel by an industrial camera; performing detection on a region of interest (ROI) on the image, where the ROI of the image is taken as a to-be-detected image; extracting a feature descriptor from a histogram of oriented gradient of the to-be-detected image; inputting the feature descriptor into a trained classifier model for proceeding with recognition and classification; and outputting a detection result on a basis of a determination made by the trained classifier model.

In one embodiment, before the step of performing detection on the ROI on the image, said method further comprises performing image preprocessing on the image of the substrate of the display panel captured by the industrial camera.

In one embodiment, the image preprocessing comprises noise reduction.

In one embodiment, said method further comprises collecting positive image samples with defects and negative image samples without defects; performing feature extraction on histograms of oriented gradient of the positive image samples and the negative image samples; and training a classifier with inputted features of the histograms of oriented gradient of the positive image samples and the negative image samples to obtain the trained classifier model.

In one embodiment, the classifier comprises an extreme learning machine (ELM) classifier.

In one embodiment, the step of extracting the feature descriptor from the histogram of oriented gradient of the to-be-detected image comprises: computing gradient for each pixel of the to-be-detected image; establishing the histogram of oriented gradient of the to-be-detected image in unit of a cell, where a cell is consisted of a plurality of pixels; normalizing the histogram of oriented gradient in unit of a block, where a block is consisted of a plurality of cells; and collecting all of the blocks of the to-be-detected image as the feature descriptor of the histogram of oriented gradient of the to-be-detected image.

In one embodiment, the step of computing gradient for each pixel of the to-be-detected image performs the gradient computation by adopting a [−1, 0, 1] differential model with symmetry of first derivatives.

In one embodiment, in the step of establishing the histogram of oriented gradient of the to-be-detected image in unit of a cell, 9 intervals of gradient directions are adopted to classify gradient directions of the pixels.

In one embodiment, a normalization approach adopted in the step of normalizing the histogram of oriented gradient in unit of a block is L2-norm, which is represented by:

$$v \to v / \sqrt{\|v\|_2^2 + \varepsilon^2},$$

where v is a vector of a non-normalized descriptor, $\|V\|k$ is its k-norm (k=1, 2), and $\varepsilon$ is a sufficiently small constant which makes the denominator of the above equation not become a zero.

Another aspect of the present invention is to provide a defect detection method for a display panel based on histogram of oriented gradient, said method comprising: collecting positive image samples and negative image samples; performing feature extraction on histograms of oriented gradient of the positive image samples and the negative image samples; training a classifier with inputted features of the histograms of oriented gradient of the positive image samples and the negative image samples to obtain a trained classifier model; thoroughly scanning an image captured by a detection apparatus by adopting a detection window with a predetermined size; extracting a feature descriptor from a histogram of oriented gradient of an image defined in the detection window, and performing the same operation for all the images defined with the detection window; inputting each of the feature descriptors of the images defined with the detection window into the trained classifier model for proceeding with recognition and classification; and outputting a defect detection result for each image defined in the detection window on a basis of a determination made by the trained classifier model.

In one embodiment, the classifier comprises an extreme learning machine (ELM) classifier.

In one embodiment, the step of extracting the feature descriptor from the histogram of oriented gradient of the image defined in the detection window comprises: computing gradient for each pixel of the image defined in the detection window; establishing the histogram of oriented gradient of the image defined in the detection window in unit of a cell, where a cell is consisted of a plurality of pixels; normalizing the histogram of oriented gradient in unit of a block, where a block is consisted of a plurality of cells; and collecting all of the blocks of the image defined in the detection window as the feature descriptor of the histogram of oriented gradient of the image defined in the detection window.

In one embodiment, the step of computing gradient for each pixel of the image defined in the detection window performs the gradient computation by adopting a [−1, 0, 1] differential model with symmetry of first derivatives.

In one embodiment, in the step of establishing the histogram of oriented gradient of the image defined in the detection window in unit of a cell, 9 intervals of gradient directions are adopted to classify gradient directions of the pixels.

In one embodiment, a normalization approach adopted in the step of normalizing the histogram of oriented gradient in unit of a block is L2-norm, which is represented by:

$$v \to v \Big/ \sqrt{\|v\|_2^2 + \varepsilon^2},$$

where v is a vector of a non-normalized descriptor, $\|V\|k$ is its k-norm (k=1, 2), and $\varepsilon$ is a sufficiently small constant which makes the denominator of the above equation not become a zero.

Still another aspect of the present invention is to provide a defect detection method for a display panel based on histogram of oriented gradient, said method comprising: thoroughly scanning an image captured by a detection apparatus by adopting a detection window with a predetermined size; extracting a feature descriptor from a histogram of oriented gradient of an image defined in the detection window, and performing the same operation for all the images defined with the detection window; inputting each of the feature descriptors of the images defined with the detection window into a trained classifier model for proceeding with recognition and classification; and outputting a defect detection result for each image defined in the detection window on a basis of a determination made by the trained classifier model.

In one embodiment, the step of extracting the feature descriptor from the histogram of oriented gradient of the image defined in the detection window comprises: computing gradient for each pixel of the image defined in the detection window; establishing the histogram of oriented gradient of the image defined in the detection window in unit of a cell, where a cell is consisted of a plurality of pixels; normalizing the histogram of oriented gradient in unit of a block, where a block is consisted of a plurality of cells; and collecting all of the blocks of the image defined in the detection window as the feature descriptor of the histogram of oriented gradient of the image defined in the detection window.

In one embodiment, the step of computing gradient for each pixel of the image defined in the detection window performs the gradient computation by adopting a [−1, 0, 1] differential model with symmetry of first derivatives.

In one embodiment, in the step of establishing the histogram of oriented gradient of the image defined in the detection window in unit of a cell, 9 intervals of gradient directions are adopted to classify gradient directions of the pixels.

In one embodiment, a normalization approach adopted in the step of normalizing the histogram of oriented gradient in unit of a block is L2-norm, which is represented by:

$$v \to v \Big/ \sqrt{\|v\|_2^2 + \varepsilon^2},$$

where v is a vector of a non-normalized descriptor, $\|V\|k$ is its k-norm (k=1, 2), and $\varepsilon$ is a sufficiently small constant which makes the denominator of the above equation not become a zero.

For the first time, the present invention introduces the HOG feature into the defect detection on display panels. As to drawbacks of the HOG feature algorithm and its long computation time, the ROI approach is adopted in the present invention for the HOG feature extraction to carry out reducing computations and computation time and further increasing the accuracy of defect detection.

To make above content of the present invention more easily understood, it will be described in details by using preferred embodiments in conjunction with the appending drawings.

DETAILED DESCRIPTION OF THE PREFERRED EMBODIMENTS

The following descriptions for the respective embodiments are specific embodiments capable of being implemented for illustrations of the present invention with referring to appended figures.

Feature description of histogram of oriented gradient (HOG) is an approach firstly used in human body motion detection and pedestrian tracking. However, HOG feature algorithm is very complicated and therefore takes a long time in computation. For the first time, the present invention introduces a HOG feature descriptor into defect detection on display panels. As to drawbacks of the HOG feature algorithm, a region of interest (ROI) approach is adopted in the present invention for feature extraction to carry out dimensionality reduction and a reduction in computation time. Also, an extreme learning machine (ELM) classifier is first applied by the present invention to defect detection. Experimental results indicate that the defect detection method provided in the present invention for a display panel based on histogram of oriented gradient outcomes an accurate and fast detection for detects in the display panel.

Figure 1:
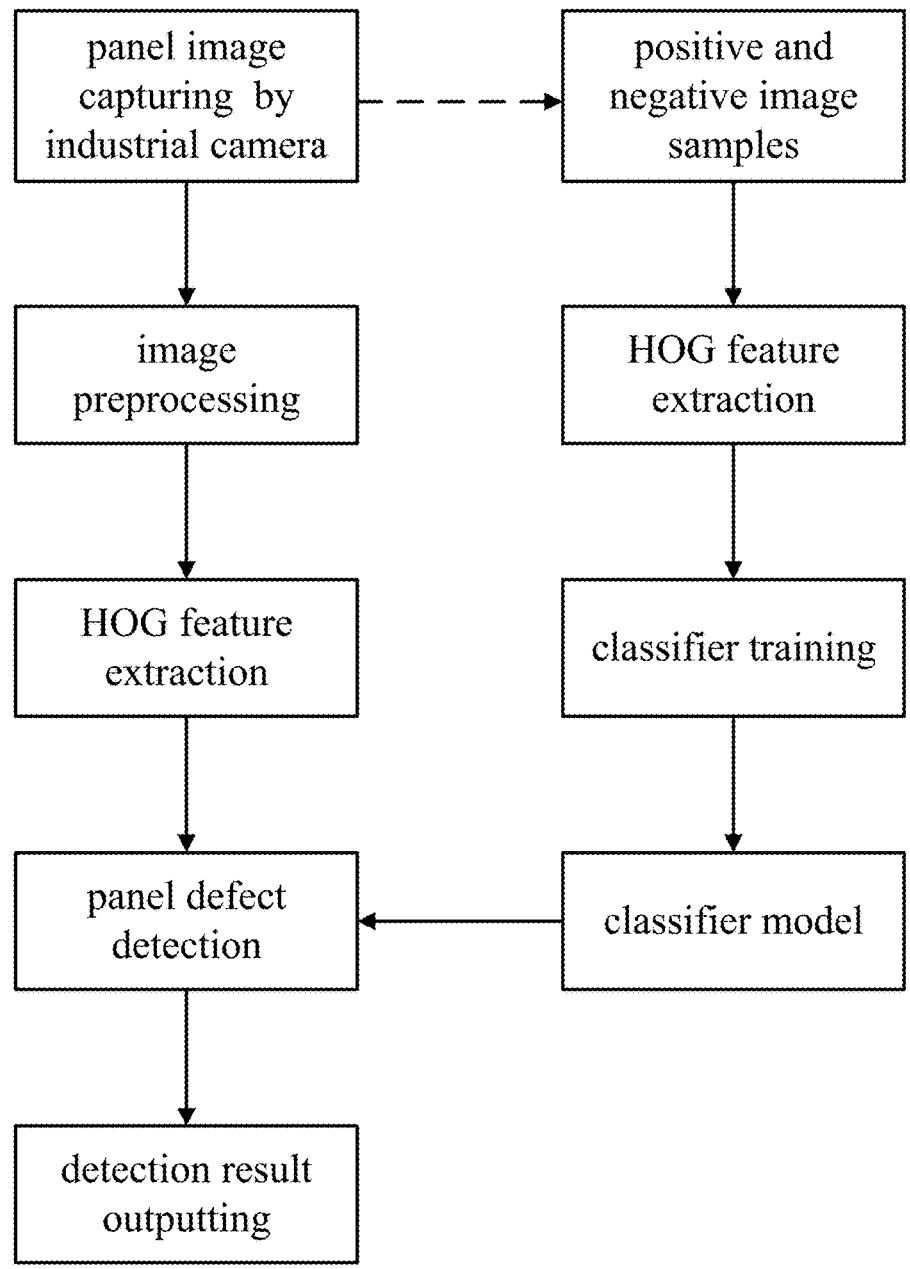
FIG. 1 is a schematic diagram illustrating the concept of defect detection in accordance with the present invention.

Please refer to FIG. 1. The defect detection method of the present invention is primarily constructed by two parts. The first part is to collect positive and negative image samples, extract HOG features, and train a classifier by inputting sample features thereto to obtain a practicable classifier model. The second part is to input an image of a substrate of a display panel (e.g., a TFT-LCD panel) captured by an industrial camera of a detection apparatus into a computer for proceeding with basic image preprocessing (e.g., noise reduction), perform HOG feature extraction, input a feature vector obtained from the extraction into the trained classifier model for proceeding with recognition and classification, and bring up a classification determination and output a detection result indicating whether or not defects are shown in the detected image.

Figure 2A:
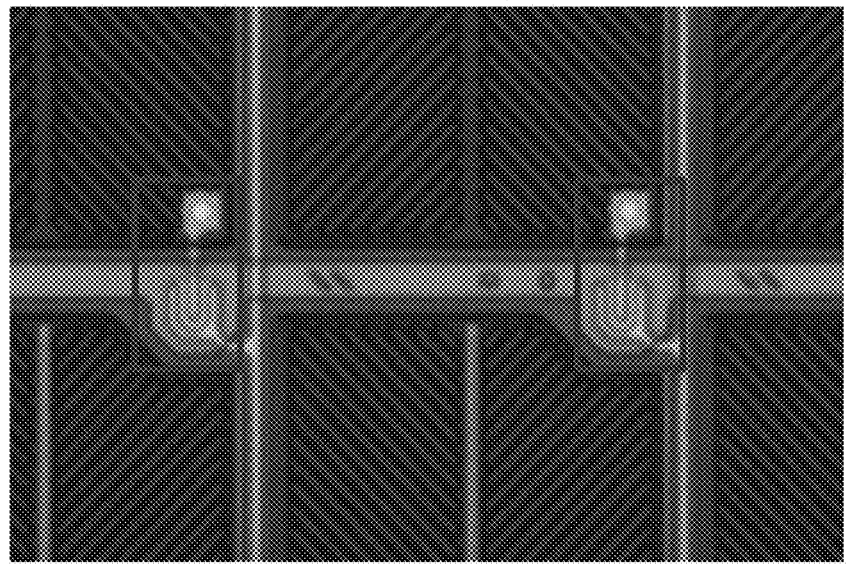
FIG. 2A is a diagram showing a normal image without a source-drain short.
Figure 2B:
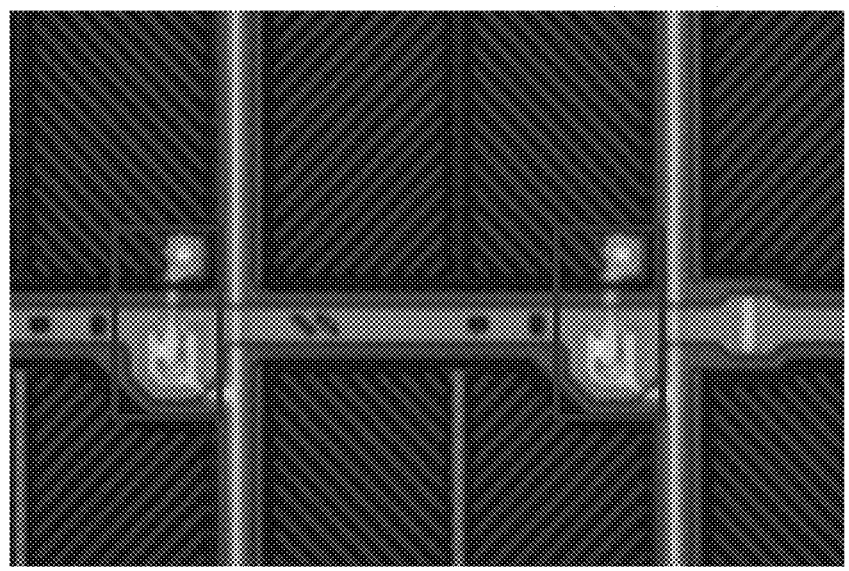
FIG. 2B is a diagram showing an image with a source-drain short.

There are many types of defects in a display panel. The detection algorithm provided below is illustrated by a source-drain short defect among various line defects but the present invention is also applicable to other types of defects. The source-drain short is a common line defect in a TFT-LCD panel. As shown in FIG. 2A and FIG. 2B, FIG. 2A shows a normal image while FIG. 2B shows an image with the source-drain short. A short occurred between a source electrode and a drain electrode of a thin film transistor may easily lead to a bright dot defect, thereby affecting the display quality.

Figure 3:
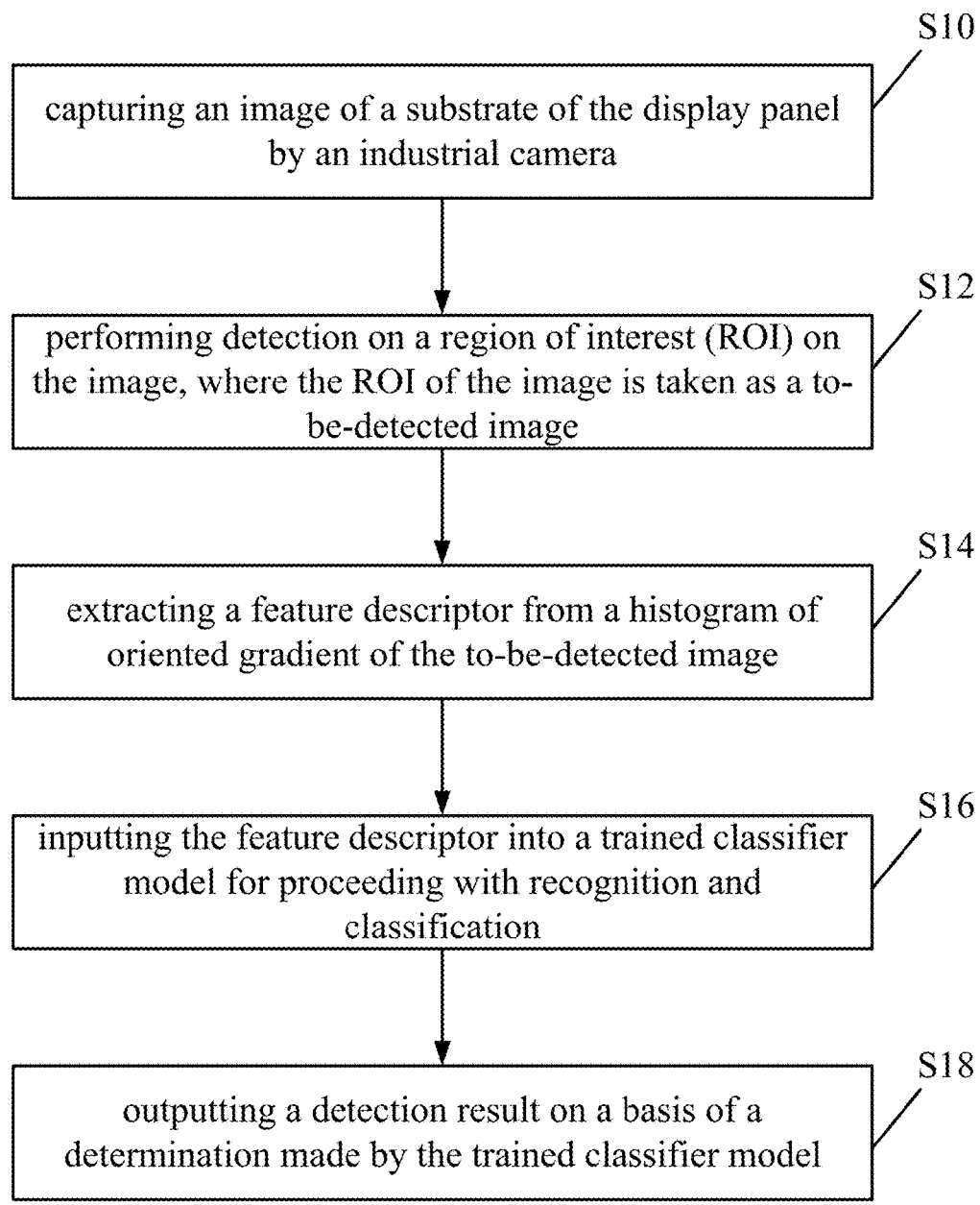
FIG. 3 is a flow chart of a defect detection method for a display panel based on histogram of oriented gradient in accordance with the present invention.
Figure 4:
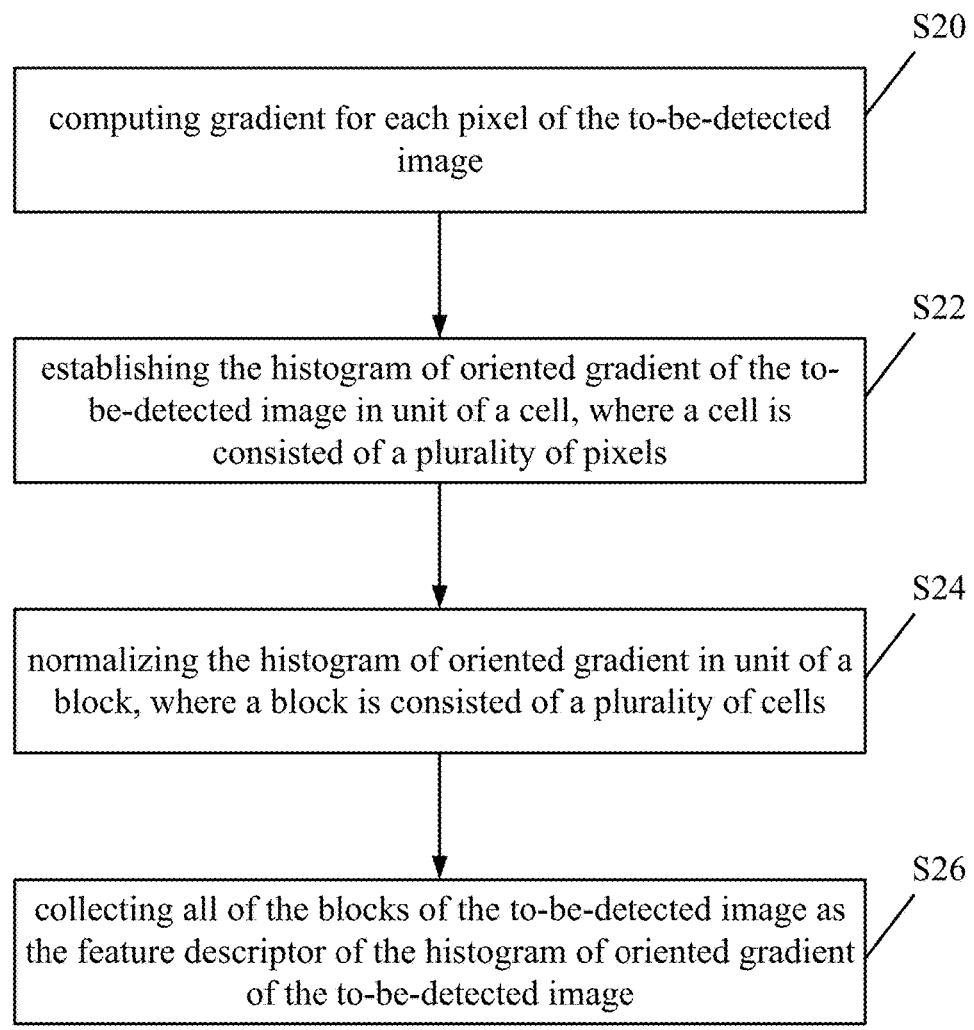
FIG. 4 is a flow chart of a step of extracting a feature descriptor from a histogram of oriented gradient of a to-be-detected image in FIG. 3.

Please refer to FIG. 3, which is a flow chart of a defect detection method for a display panel based on histogram of oriented gradient in accordance with the present invention. This flow chart corresponds to the afore-mentioned second part. Specifically, the defect detection method may comprise the following steps.

In Step S10, an image of a substrate of the display panel is captured by an industrial camera.

In Step S12, detection on a region of interest (ROI) on the image is performed, where the ROI of the image is taken as a to-be-detected image.

In Step S14, a feature descriptor is extracted from a histogram of oriented gradient of the to-be-detected image.

In Step S16, the feature descriptor is inputted into a trained classifier model for proceeding with recognition and classification.

In Step S18, a detection result is outputted on a basis of a determination made by the trained classifier model.

As to Step S10, an industrial camera deployed in a detection apparatus is used to capture an image of a substrate of a display panel (e.g., a TFT-LCD panel). For example, an image of a TFT array substrate is captured and is then used for detecting source-drain short defects. This image capturing step may be proceeded during the manufacture of display panel for instantly detecting the defects that may occur in respective procedures of the display panel manufacture. For example, detection on source-drain short defects in the TFT array substrate is performed after the source and drain electrodes are fabricated prior to cell engineering.

As to Step S12, a region of interest (ROI) on the image is selected as a to-be-detected image for the defect detection. In the case of detection on source-drain short defects, the ROI of the image is a region where a thin film transistor is disposed, for example. The thin film transistors of the TFT array substrate have substantially the same size and the same interval as well as the position where a source-drain short defect may occur is substantially the same. Accordingly, the detection may be performed only on the ROI of the image. For example, the image of the substrate of the display panel captured by the industrial camera may be thoroughly scanned in accordance with the position of the thin film transistors by adopting a detection window with a predetermined size. The source-drain short defect detection is performed for each image defined in the detection window.

As to Step S14, a histogram of oriented gradient of the to-be-detected image (e.g., an image defined in the window in Step S12) is established and a feature descriptor thereof is extracted. This process will be described detailedly in Steps S20 to S26 below. After that, as to Step 16, the feature descriptor is inputted to a trained classifier model for determining whether or not a defect is existed. According to analyses on some samples for training, the trained classifier model may proceed with recognition and classification for the feature descriptor obtained in Step S14. The establishment of classifier model is described detailedly in Steps S30 to S34 below. As to Step S18, a detection result is outputted for indicating whether or not a short defect is existed in the source and drain electrodes of the thin film transistor corresponding to the to-be-detected image.

Specifically, in Step S14, the step of extracting the feature descriptor from the histogram of oriented gradient of the to-be-detected image may comprise the following steps.

In Step S20, gradient is computed for each pixel of the to-be-detected image.

In this step, describing an image by way of gradient not only intensifies the image outline but also minimizes the effects of light changes. For a digital image, a two-dimensional discrete function may be taken to describe the digital image. The image gradient computation is to take a derivative of the two-dimensional discrete function. Essentially, horizontal and vertical pixel difference is adopted to approximate a gradient operator. In practice, an approximation of the gradient may be calculated by using a first order differential model such as $[-1, 1]$ with asymmetry of first derivatives, $[-1, 0, 1]$ with symmetry of first derivatives, $[1, -8, 0, 8, -1]$ for cubic correction, 3×3 Sobel mask, and 2×2 diagonal mask.

Figure 5A:
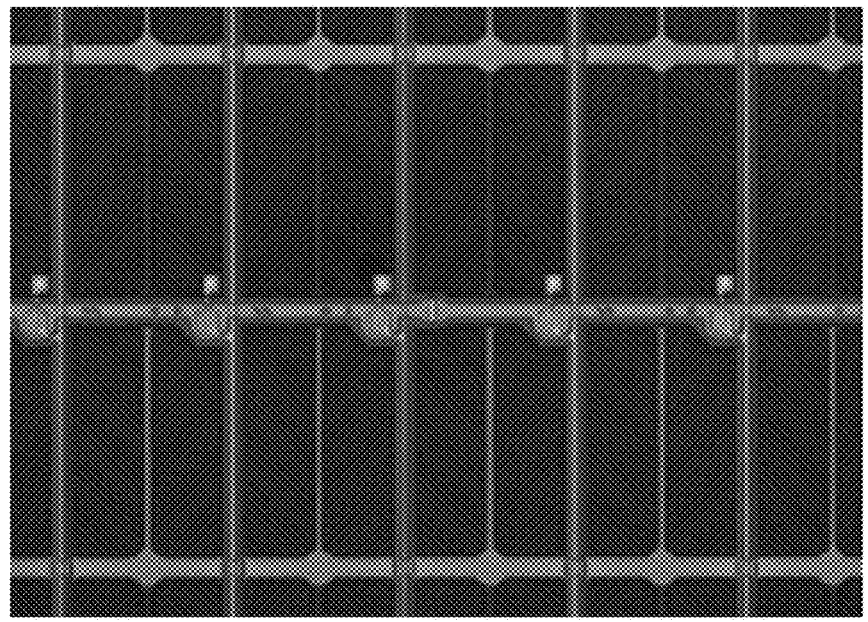
FIG. 5A is a diagram showing an original image.
Figure 5B:
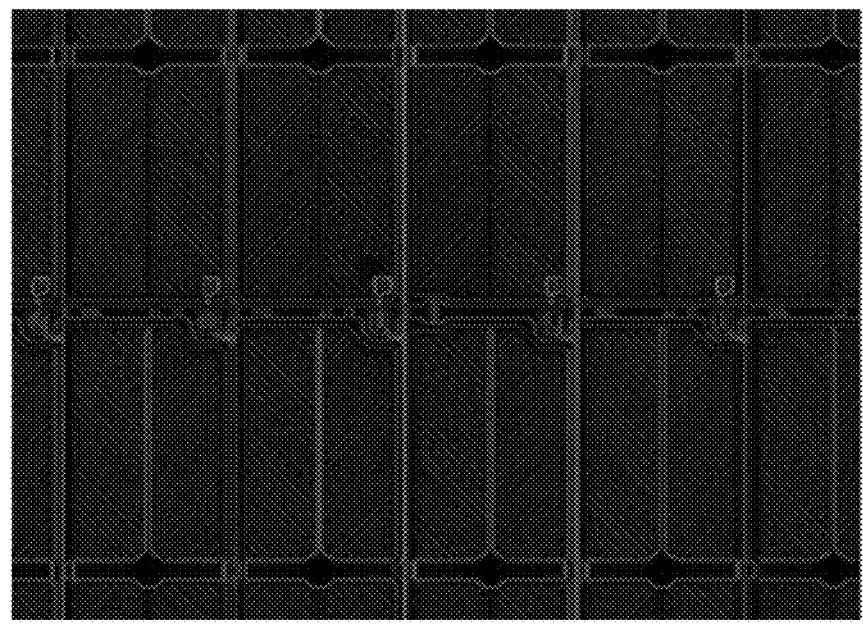
FIG. 5B depicts a result obtained after gradient computation is performed on the original image shown in FIG. 5A.

In the present invention, experimental results show that the simplest model, i.e., $[-1, 0, 1]$, gets best effect. Therefore, it is preferred to adopt the $[-1, 0, 1]$ differential model with symmetry of first derivatives in this step. FIG. 5A shows an original image. FIG. 5B depicts a result obtained after the gradient computation is performed on the original image.

Assuming that a function of an image is $f(x, y)$, the $[-1, 0, 1]$ differential model with symmetry of first derivatives used for the gradient computation may be represented by $$f_x(x,y)=f(x+1,y)-f(x-1,y)$$

$$f_y(x,y)=f(x,y+1)-f(x,y-1) \quad (1)$$

where $f_x(x, y)$ and $f_y(x, y)$ indicate the gradients of a pixel dot $(x, y)$ respectively in horizontal and vertical directions.

In Step S22, the histogram of oriented gradient of the to-be-detected image is established in unit of a cell, where a cell is consisted of a plurality of pixels.

Figure 6A:
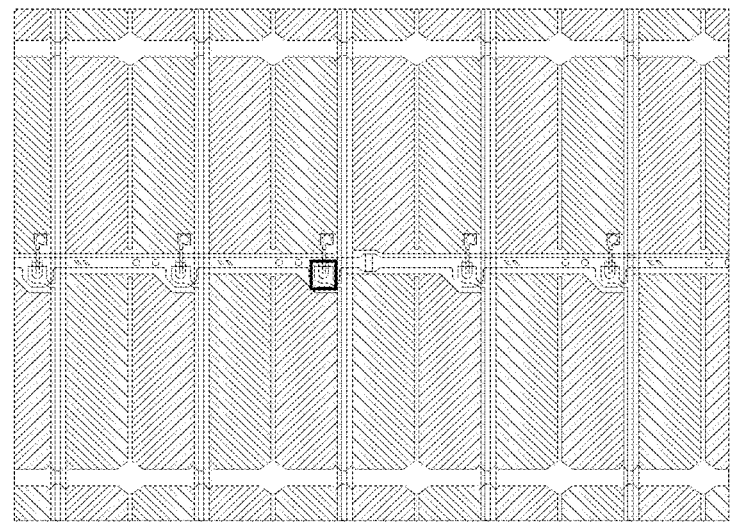
FIG. 6A is a diagram showing a part of an image captured by a detection apparatus.
Figure 6B:
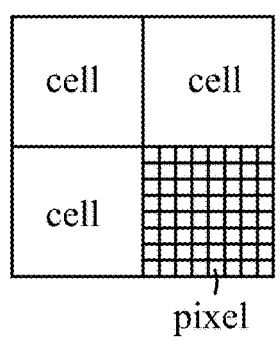
FIG. 6B is a schematic diagram showing an enlargement of a box shown in FIG. 6, where a cell includes a plurality of pixels.

In this Step, establishing the histogram of oriented gradient of the to-be-detected image in unit of a cell plays a key role in the entire HOG feature extraction. The smallest unit for the HOG feature computation is a cell, which is consisted of a plurality of pixels. As shown in FIG. 6A and FIG. 6B, FIG. 6B is an enlargement of a box in FIG. 6A, and FIG. 6B shows a cell consisted of a plurality of pixels.

Figure 6C:
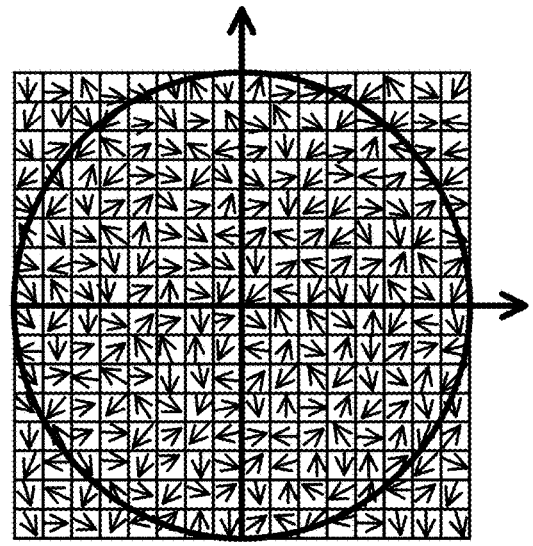
FIG. 6C is a schematic diagram showing gradient directions for the respective pixels.

As shown in FIG. 6C, the directions of gradient vectors of the respective pixels are shown. Assuming that the directions are divided into several intervals within 180° (i.e., unsigned gradient), a direction of gradient vector is therefore determined by Equation (2) below.

$$\theta = \begin{cases} \theta + \pi, & \theta < 0 \\ \theta, & \theta \geq 0 \end{cases} \quad (2)$$

Precision on directional segments is necessary for detection performance. The detection performance is improved when 180 degrees are equally divided into 9 intervals. If the number of intervals is larger than 9, the improvement is not apparent any longer. Therefore, the number of directional intervals for the histogram of oriented gradient is preferably set as 9 in the present invention.

For example, an image having 16×16 pixels is extracted from the to-be-detected image, a cell is consisted of 8×8 pixels, 2×2 cells form a block, and the number of directional intervals is nine, i.e., 0° to 20° for a first interval, 20° to 40° for a second interval, . . . , 140° to 160° for an eighth interval, and 160° to 180° for a ninth interval. The values and directions of gradient vectors for all the pixels in a cell are calculated. For example, if the gradient direction of a certain pixel is 137°, such a direction is within a range of 120° to 140°, that is, the seventh interval. The value of gradient vector of the pixel serves as a weighting coefficient accumulated in the seventh interval. Similarly, which interval a direction of gradient vector belongs is determined for all the pixels in this cell and the values of gradient vectors are accumulated. The histogram of oriented gradient of this cell is therefore established. The histograms of oriented gradient of all the cells in the to-be-detected image constructs a histogram of oriented gradient of the to-be-detected image.

In Step S24, the histogram of oriented gradient is normalized in unit of a block, where a block is consisted of a plurality of cells.

Figure 6D:
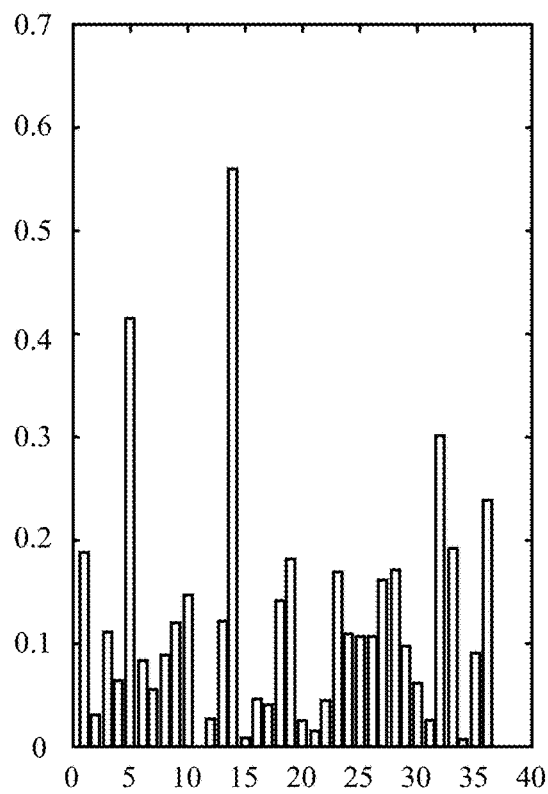
FIG. 6D is a diagram showing a histogram of oriented gradient.
Figure 6E:
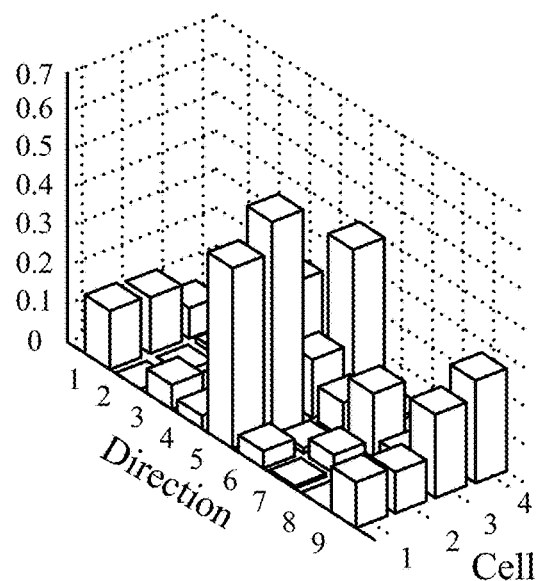
FIG. 6E is a diagram showing a histogram of oriented gradient with normalized blocks in three dimensions.

The plural cells create a block. In this step, the histograms of oriented gradient of the cells are normalized in unit of a block. Due to local illumination and contrast differences between foreground and background, different images or different parts of an image may have large differences of values of the gradient vectors. Therefore, it may need to normalize local contrasts for the image in order to assure standardization and accuracy of HOG feature description. The normalization is to incorporate a cell into a larger block area, and the normalization and comparison are proceeded in each individual block. The vectors of the cells obtained after all the blocks are normalized (normalization of values of the histograms) are eventually a HOG feature descriptor (as shown in FIG. 6D and FIG. 6E). Since each part in the image affects an area surrounding it, the respective blocks are overlapped to each other for a certain degree in order to assure defect performance. In this way, the values of each cell influence several parts of the eventual descriptor.

Assuming that v is a vector of a non-normalized descriptor, $\|V\|k$ is its k-norm (k=1, 2), and $\epsilon$ is a sufficiently small constant which makes a denominator not become a zero, a normalization approach adopted in the present disclosure is L2-norm (or called Euclidean norm), which is represented by $$v \rightarrow v \Big/ \sqrt{\|v\|_2^2 + \varepsilon^2} \quad (3)$$

As can be known from above equation, the denominator is actually the magnitude of a gradient.

A normalized cell eventually generates nine-dimensional vectors since the plane is divided into nine directions. FIG. 6E shows a histogram of oriented gradient with normalized blocks in three dimensions. In one embodiment, each block includes four cells and each cell has a histogram of oriented gradient established with nine directional intervals. Accordingly, each block includes 36-dimensional (9×4=36) feature vectors.

In Step S26, all of the blocks of the to-be-detected image are collected as the feature descriptor of the histogram of oriented gradient of the to-be-detected image.

As to Step S24, after the histograms established in unit of a cell are normalized in unit of a block, all the blocks of the to-be-detected image are collected as multiple-dimensional vectors, which are eventually the HOG feature descriptor of the to-be-detected image.

Before the step of computing gradient for each pixel of the to-be-detected image (i.e., Step S20), image processing may be performed on the to-be-detected image corresponding to the ROI (region of interest) obtained in Step S12. For example, gamma correction may be adopted to process the to-be-detected image. In practice, since there are differences between different detection apparatus, the captured images may have chromatic aberration and background differences. A good detection performance and robustness is obtained only if the extracted HOG feature is insensitive to these differences. It can be assured to improve the detection performance and robustness under varying illumination by adopting the gamma correction to process the image. However, the afore-described image preprocessing can be omitted since normalization of the blocks has been performed in Step S24.

There are two approaches commonly used in the gamma correction, that is, square root and logarithm compression. For the images described with RGB color space, the experimental results of the present invention show that the detection performance is slightly improved by square root gamma compression on each color channel while the detection performance is degenerated by using the logarithm compression since its suppressed magnitude is too much.

In embodiments of the present invention, the entire image captured by a detection apparatus is thoroughly scanned by adopting a detection window with a predetermined size, and the HOG feature vector is computed for each individual image defined in the detection window. Assuming that an overlap rate for the blocks is 0.5 (i.e., eight pixels are overlapped between two adjacent blocks), one block includes 16×16 pixels, and the image captured by the detection apparatus has 768×576 pixels, there are 6745 (i.e., [(768−16)/8+1]×[(576−16)/8+1]=6745) blocks needed to be computed for the captured image thoroughly scanned. It results in 242820 (i.e., 6745×36=242820) dimensions for each vector. The amount of calculations is quite large. Actually, calculations on the entire image take 26 s, approximately.

In accordance with Step S12, the embodiments of the present invention are to detect the ROI of the image captured by the detection apparatus. Dimensionality reduction and a reduction in computation time may be carried out by adopting only the ROI to perform HOG feature computations since the thin film transistors in TFT-LCD wiring structures have substantially the same size and the same interval as well as the position where a source-drain short defect may occur is substantially the same. The experimental results show that a thin film transistor can be described appropriately by an image of 32×64 pixels. The HOG feature vector may have only 756 (i.e., [(32−16)/8+1]×[(64−16)/8+1]× 36=756) dimensions in this regard. The number of dimensions is greatly decreased and the computation time is only 0.2 s, approximately. For an entire captured image, at most five thin film transistors are included in that image. Accordingly, five detection windows, each of which has 32×64 pixels, are only needed for the entire captured image. In this circumstance, the computation time is only 1 s, approximately, and therefore the detection speed is highly improved.

Figure 7:
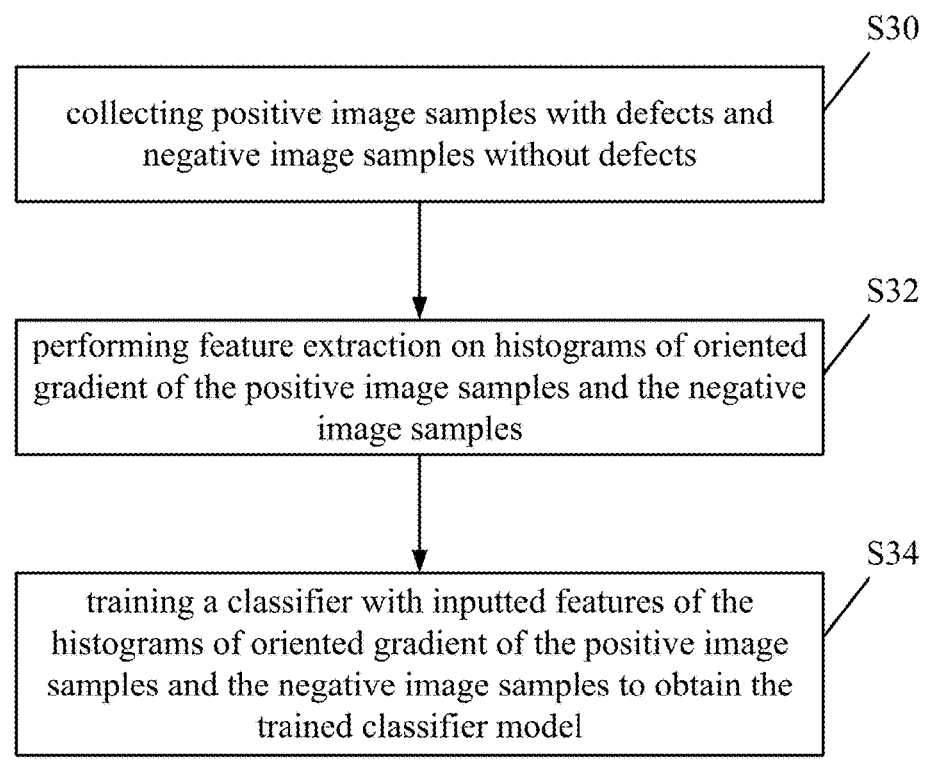
FIG. 7 is a flow chart of a classifier training procedure.

Please refer to FIG. 7, which is a flow chart of a classifier training procedure. This flow chart corresponds to the aforementioned first part, i.e., the establishment of a trained classifier model. Specifically, the classifier training procedure may comprise the following steps.

In Step S30, positive image samples with defects and negative image samples without defects are collected.

In Step S32, feature extraction is performed on histograms of oriented gradient of the positive image samples and the negative image samples.

In Step S34, a classifier is trained with inputted features of the histograms of oriented gradient of the positive image samples and the negative image samples to obtain a trained classifier model.

Figure 8A:
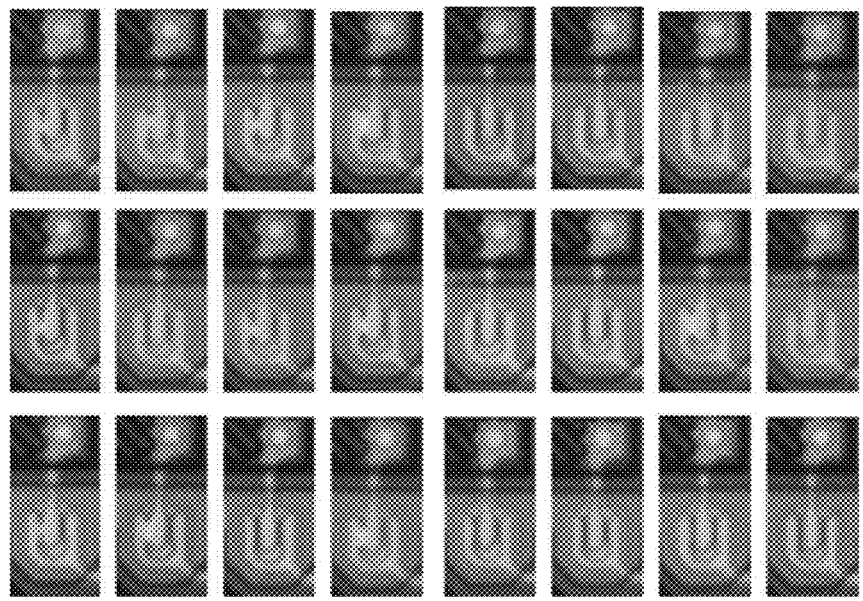
FIG. 8A shows some positive image samples used in the classifier training procedure.
Figure 8B:
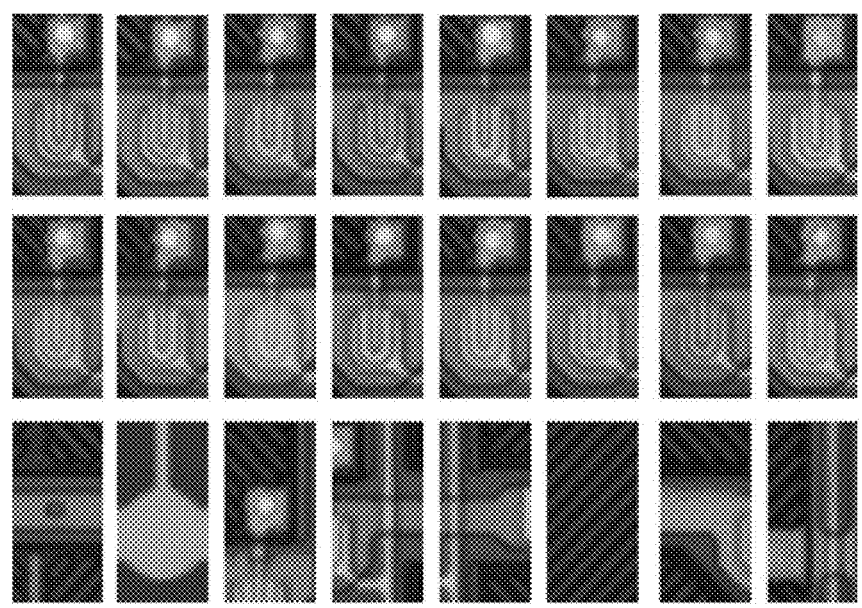
FIG. 8B shows some negative image samples used in the classifier training procedure.

As to Step S30, in accordance with experiments conducted in the present invention, 200 samples are randomly collected from the images of display panels captured by the detection apparatus. Amongst, there are 40 positive samples with source-drain shorts, and some of the positive image samples are shown in FIG. 8A. There are 160 negative samples, where the number of negative samples with normal source and drain electrodes is 146. In consideration of deviation of the detection window scanning position, there also adds 14 random negative image samples that are not thin film transistors. Some of the negative image samples are shown in FIG. 8B.

As to Step S32, feature extraction is performed on histograms of oriented gradient of the positive and negative image samples randomly collected in Step S30. For example, each image sample is proceeded with the aforementioned Step S20 to Step S26 so as to obtain the feature descriptors of the histograms of oriented gradient of the respective image samples. After that, as to Step S34, a classifier is trained with inputted feature descriptors of the histograms of oriented gradient of all the image samples so as to obtain a trained classifier model. When defect detection on the display panel is performed, whether or not a defect is existed in the to-be-detected image is determined by way of inputting the obtained feature descriptor of the to-be-detected image into the trained classifier model obtained in Step S34 for proceeding with recognition and classification. The classifier may be a support vector machine (SVM) classifier or an extreme learning machine (ELM) classifier. The ELM classifier is preferred.

Improving the accuracy of defect detection on the display panel by the detection apparatus and the detection speed is important for display panel yield rate and the capacity of production. For the first time, the present invention introduces the HOG feature into the defect detection on display panels. As to drawbacks of the HOG feature algorithm and its long computation time, the ROI approach is adopted in the present invention for the HOG feature extraction to carry out reducing computations and computation time and further increasing the accuracy of defect detection. In the present disclosure, as illustrated by source-drain short defects, a SVM classifier model and an ELM classifier model are respectively established with HOG features of the samples serving as an input. Experimental results indicate that the detection accuracies of TFT-LCD defects detected based on HOG features are both 100% in the SVM and the ELM classifier model. However, ELM detection is faster than SVM detection, and ELM detection time is only 3.5 s. So the present invention can meet the defect automatic detection of display panel requirements of accuracy and rapid speed and is applicable to a detection system with somewhat real-time demands.

While the preferred embodiments of the present invention have been illustrated and described in detail, various modifications and alterations can be made by persons skilled in this art. The embodiment of the present invention is therefore described in an illustrative but not restrictive sense. It is intended that the present invention should not be limited to the particular forms as illustrated, and that all modifications and alterations which maintain the spirit and realm of the present invention are within the scope as defined in the appended claims.

What is claimed is:

1. A defect detection method for a display panel based on histogram of oriented gradient, said method comprising:
    capturing an image of a substrate of the display panel by an industrial camera;
    performing detection on a region of interest (ROI) on the image, where the ROI of the image is taken as a to-be-detected image;
    extracting a feature descriptor from a histogram of oriented gradient of the to-be-detected image;
    inputting the feature descriptor into a trained classifier model for proceeding with recognition and classification;
    outputting a detection result on a basis of a determination made by the trained classifier model,
    collecting positive image samples with defects and negative image samples without defects;
    performing feature extraction on histograms of oriented gradient of the positive image samples and the negative image samples; and training a classifier with inputted features of the histograms of oriented gradient of the positive image samples and the negative image samples to obtain the trained classifier model.

2. The method according to claim 1, before the step of performing detection on the ROI on the image, said method further comprising:
performing image preprocessing on the image of the substrate of the display panel captured by the industrial camera.

3. The method according to claim 2, wherein the image preprocessing comprises noise reduction.

4. The method according to claim 1, wherein the classifier comprises an extreme learning machine (ELM) classifier.

5. The method according to claim 1, wherein the step of extracting the feature descriptor from the histogram of oriented gradient of the to-be-detected image comprises:
computing gradient for each pixel of the to-be-detected image;
establishing the histogram of oriented gradient of the to-be-detected image in unit of a cell, where a cell is consisted of a plurality of pixels;
normalizing the histogram of oriented gradient in unit of a block, where a block is consisted of a plurality of cells; and
collecting all of the blocks of the to-be-detected image as the feature descriptor of the histogram of oriented gradient of the to-be-detected image.

6. The method according to claim 5, wherein the step of computing gradient for each pixel of the to-be-detected image performs the gradient computation by adopting a [−1, 0, 1] differential model with symmetry of first derivatives.

7. The method according to claim 5, wherein in the step of establishing the histogram of oriented gradient of the to-be-detected image in unit of a cell, 9 intervals of gradient directions are adopted to classify gradient directions of the pixels.

8. The method according to claim 5, wherein a normalization approach adopted in the step of normalizing the histogram of oriented gradient in unit of a block is L2-norm, which is represented by:

$$v \to v \Big/ \sqrt{\|v\|_2^2 + \varepsilon^2},$$

where v is a vector of a non-normalized descriptor, $\|V\|k$ is its k-norm (k=1, 2), and $\varepsilon$ is a sufficiently small constant which makes the denominator of the above equation not become a zero.

9. A defect detection method for a display panel based on histogram of oriented gradient, said method comprising:
collecting positive image samples and negative image samples;
performing feature extraction on histograms of oriented gradient of the positive image samples and the negative image samples;
training a classifier with inputted features of the histograms of oriented gradient of the positive image samples and the negative image samples to obtain a trained classifier model;
thoroughly scanning an image captured by a detection apparatus by adopting a detection window with a predetermined size;
extracting a feature descriptor from a histogram of oriented gradient of an image defined in the detection window, and performing the same operation for all the images defined with the detection window;
inputting each of the feature descriptors of the images defined with the detection window into the trained classifier model for proceeding with recognition and classification; and
outputting a defect detection result for each image defined in the detection window on a basis of a determination made by the trained classifier model.

10. The method according to claim 9, wherein the classifier comprises an extreme learning machine (ELM) classifier.

11. The method according to claim 9, wherein the step of extracting the feature descriptor from the histogram of oriented gradient of the image defined in the detection window comprises:
computing gradient for each pixel of the image defined in the detection window;
establishing the histogram of oriented gradient of the image defined in the detection window in unit of a cell, where a cell is consisted of a plurality of pixels;
normalizing the histogram of oriented gradient in unit of a block, where a block is consisted of a plurality of cells; and
collecting all of the blocks of the image defined in the detection window as the feature descriptor of the histogram of oriented gradient of the image defined in the detection window.

12. The method according to claim 11, wherein the step of computing gradient for each pixel of the image defined in the detection window performs the gradient computation by adopting a [−1, 0, 1] differential model with symmetry of first derivatives.

13. The method according to claim 11, wherein in the step of establishing the histogram of oriented gradient of the image defined in the detection window in unit of a cell, 9 intervals of gradient directions are adopted to classify gradient directions of the pixels.

14. The method according to claim 11, wherein a normalization approach adopted in the step of normalizing the histogram of oriented gradient in unit of a block is L2-norm, which is represented by:

$$v \to v \Big/ \sqrt{\|v\|_2^2 + \varepsilon^2},$$

where v is a vector of a non-normalized descriptor, $\|V\|k$ is its k-norm (k=1, 2), and $\varepsilon$ is a sufficiently small constant which makes the denominator of the above equation not become a zero.

15. A defect detection method for a display panel based on histogram of oriented gradient, said method comprising:
thoroughly scanning an image captured by a detection apparatus by adopting a detection window with a predetermined size;
extracting a feature descriptor from a histogram of oriented gradient of an image defined in the detection window, and performing the same operation for all the images defined with the detection window;
inputting each of the feature descriptors of the images defined with the detection window into a trained classifier model for proceeding with recognition and classification; and outputting a defect detection result for each image defined in the detection window on a basis of a determination made by the trained classifier model.

16. The method according to claim 15, wherein the step of extracting the feature descriptor from the histogram of oriented gradient of the image defined in the detection window comprises:
- computing gradient for each pixel of the image defined in the detection window;
- establishing the histogram of oriented gradient of the image defined in the detection window in unit of a cell, where a cell is consisted of a plurality of pixels;
- normalizing the histogram of oriented gradient in unit of a block, where a block is consisted of a plurality of cells; and
- collecting all of the blocks of the image defined in the detection window as the feature descriptor of the histogram of oriented gradient of the image defined in the detection window.

17. The method according to claim 16, wherein the step of computing gradient for each pixel of the image defined in the detection window performs the gradient computation by adopting a [−1, 0, 1] differential model with symmetry of first derivatives.

18. The method according to claim 16, wherein in the step of establishing the histogram of oriented gradient of the image defined in the detection window in unit of a cell, 9 intervals of gradient directions are adopted to classify gradient directions of the pixels.

19. The method according to claim 16, wherein a normalization approach adopted in the step of normalizing the histogram of oriented gradient in unit of a block is L2-norm, which is represented by:

$$v \to v \Big/ \sqrt{\|v\|_2^2 + \varepsilon^2},$$

where v is a vector of a non-normalized descriptor, $\|V\|k$ is its k-norm (k=1, 2), and $\epsilon$ is a sufficiently small constant which makes the denominator of the above equation not become a zero.

* * * * *